(12) United States Patent
Fukuda et al.

(10) Patent No.: US 8,120,495 B2
(45) Date of Patent: Feb. 21, 2012

(54) RFID SYSTEM

(75) Inventors: Kaoru Fukuda, Fujisawa (JP);
Yoshinori Kimura, Isehara (JP);
Tsuyoshi Matsueda, Kawasaki (JP);
Hitoshi Nishino, Zushi (JP); Shiroh Sakamoto, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 12/197,509

(22) Filed: Aug. 25, 2008

(65) Prior Publication Data

US 2009/0072949 A1 Mar. 19, 2009

(30) Foreign Application Priority Data

Sep. 13, 2007 (JP) ................................ 2007-238203

(51) Int. Cl.
*G08B 13/14* (2006.01)

(52) U.S. Cl. ................... 340/572.7; 340/10.1; 340/10.5; 340/572.1

(58) Field of Classification Search .................. 340/572, 340/10, 505
See application file for complete search history.

(56) References Cited

U.S. PATENT DOCUMENTS

| 6,204,764 | B1 * | 3/2001 | Maloney ..................... 340/568.1 |
| 6,903,656 | B1 * | 6/2005 | Lee ............................. 340/572.1 |
| 7,071,791 | B1 * | 7/2006 | Wilson, III .................... 333/17.1 |
| 2001/0006368 | A1 * | 7/2001 | Maloney ..................... 340/568.1 |

FOREIGN PATENT DOCUMENTS

JP 2006-338120 12/2006

* cited by examiner

*Primary Examiner* — Travis Hunnings

(74) *Attorney, Agent, or Firm* — Andrea Bauer; Hoffman Warnick LLC

(57) ABSTRACT

An RFID system according to the present invention includes an RFID antenna system including: a first antenna that can communicate with an external reader/writer; an antenna selector for connecting with the first antenna; and a plurality of second antennas that can connect with the first antenna in order via the antenna selector, each of the second antennas can communicate with an IC tag that is attached to an article placed in a region defined by the second antenna.

20 Claims, 4 Drawing Sheets

RFID SYSTEM

FIELD OF THE INVENTION

The present invention relates to a contactless identifying technique using an electromagnetic wave, which is generally called an RFID (Radio Frequency Identification). The present invention particularly relates to a system that uses an RFID.

BACKGROUND ART

RFID is a technology for sending an electromagnetic wave from an interrogator (reader/writer) to an ID (IC) tag that is attached to an object to be identified, and reading or writing the ID information on the object to be identified in a contactless manner. RFID has been widely used in management and the like on inventory or history (traceability) of items, such as commercial goods, as an RFID system with integrated circuit (IC) tags attached to the items.

An RFID system includes an IC tag including an IC chip with a small antenna and a reader/writer for wirelessly communicating with the IC tag. The reader/writer has an antenna. The reader/writer sends power for driving the IC chip in the IC tag and interrogation data to the IC tag, and obtains response data from the IC tag within a range for receiving the power and interrogation data, i.e., in a region allowed for communication, via the antenna. As an aspect of the RFID system, an RFID system that connects a plurality of antennas to the reader/writer to enable communication with a plurality of IC tags has been generally known.

An RFID system that enables communication with a plurality of IC tags is disclosed in Published Unexamined Patent Application No. 2006-338120, for example. In the publication, the system is adapted to connect a plurality of loop antennas with an antenna selector that is connected with a reader/writer in order. A corresponding IC tag communicates with the reader/writer via the loop antenna that is connected with the antenna selector.

The invention disclosed in the publication has an antenna selector always connected with a reader/writer, requiring a reader/writer for each antenna selector. Therefore, when two or more commercial goods shelves are provided in a warehouse, for example, each shelf needs to have a set of an antenna selector and a reader/writer. As bigger warehouses with more number of commercial goods shelves are used, more readers/writers are required. As a reader/writer is relatively expensive, the expenditure for them is increased. Further, once a great number of the sets are settled, commercial goods data cannot be obtained from the commercial goods shelves by using other types of generally used reader/writer, because an antenna selector is always connected with a reader/writer. In other words, the settled system is less flexible. As the number of readers/writers increases, communication lines (wiring) between the readers/writers and the central control unit (host computer) become more complicated, increasing the expenditure for the wiring.

SUMMARY OF THE INVENTION

The present invention manages as many articles (items) as possible by using as few readers/writers as possible in the RFID system. Many articles (items) are managed by using general purpose readers/writers or different types of readers/writers in the RFID system. The present invention provides an RFID system with relatively simple and flexible communication paths between the readers/writers and a central control unit.

An RFID system according to an embodiment of the present invention includes an RFID antenna system comprising: a first antenna that can communicate with an external reader/writer; an antenna selector for connecting with the first antenna; and a plurality of second antennas that can connect in order with the first antenna via the antenna selector, each of the second antennas can communicate with an IC tag that is attached to an article placed in a region defined by the second antenna.

An RFID system according to another embodiment of the present invention includes a cabinet with an RFID antenna, comprising: a housing forming the cabinet; a first antenna attached on an outside surface of the housing and that can communicate with an external reader/writer; an antenna selector attached on the outside surface of the housing to connect with the first antenna; and a plurality of second antennas which are provided on at least one holder that is provided inside the housing and that can connect in order with the first antenna via the antenna selector, each of the second antennas can communicate with an IC tag that is attached to an article placed in a region defined by the second antenna.

BRIEF DESCRIPTION OF THE DRAWINGS

For a more complete understanding of the present invention, reference is now made to the following description taken in conjunction with the accompanying drawings, wherein like reference numbers refer to like components.

DETAILED DESCRIPTION OF THE INVENTION

Figure 1:
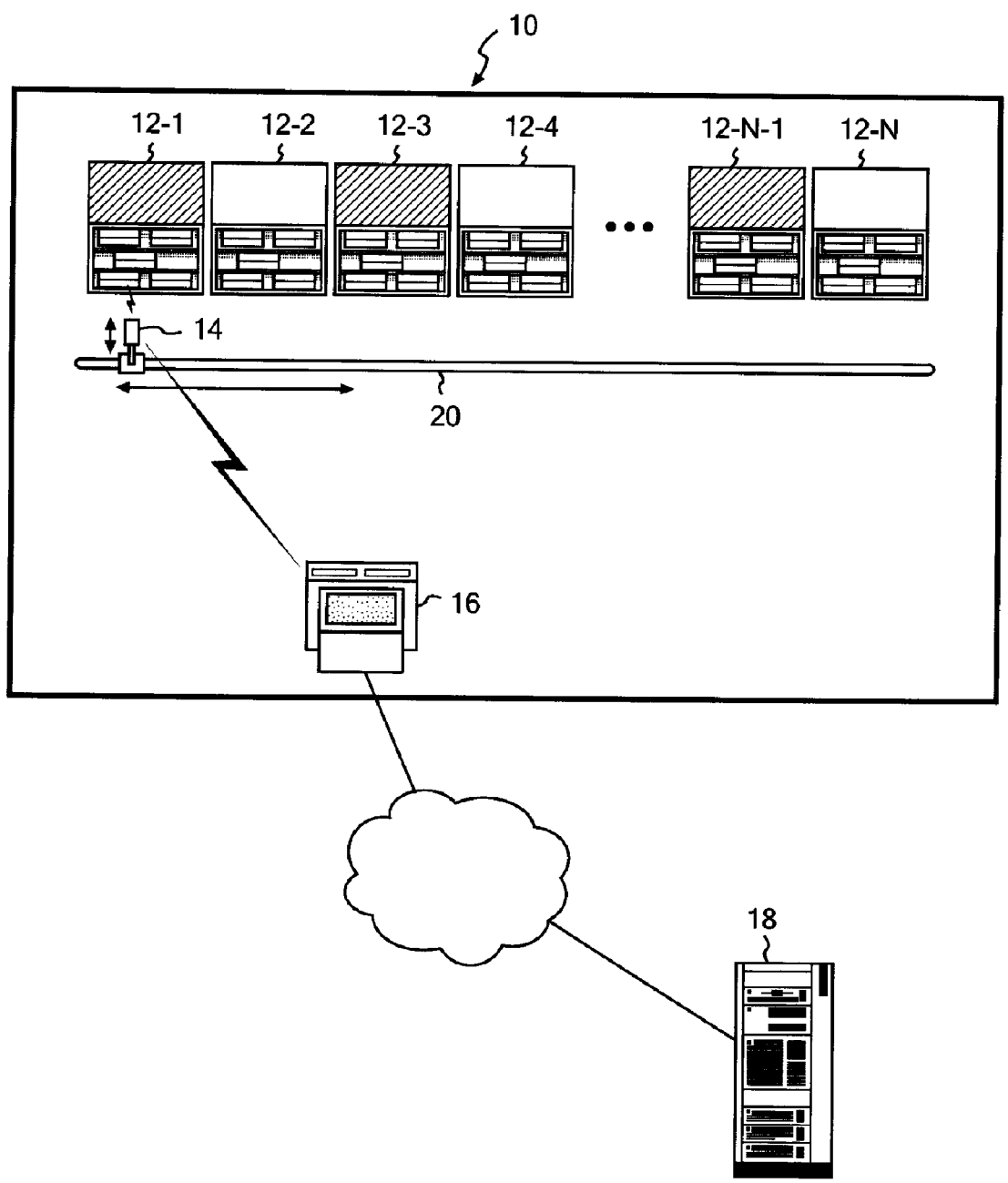
FIG. 1 is a diagram for illustrating an entire RFID system according to the present invention.

FIG. 1 is a diagram illustrating an entire RFID system according to the present invention. In FIG. 1, an item management system is provided using an RFID system. A warehouse 10 includes two or more cabinets 12-1 to 12-N therein. Each cabinet 12 may comprise a simple style cabinet such as a shelf, a closed type cabinet that can be locked, or other various types of cabinets. A plurality of the cabinets 12 include an RFID antenna according to the present invention. The cabinets 12 including an RFID antenna may comprise any of two or more cabinets 12 in a particular region of the warehouse 10, two or more cabinets 12 arranged with a predetermined space therebetween, or all of the cabinets 12. The item may be any individual object to be managed such as products or parts which are being manufactured in a factory, drugs being used in a hospital, and waste to be processed as well as commercial goods which are sold through a distribution channel.

An RFID reader/writer 14 communicates in order with each cabinet 12 with an RFID antenna while moving on a rail 20 disposed adjacent the front of the cabinets 12. As an automated warehouse is assumed in FIG. 1, the reader/writer 14 is adapted to automatically move on the rail 20 in accordance with an external signal. In an un-automated warehouse, a person carrying a handheld reader/writer moves in front of the cabinets 12 to be managed in order. In FIG. 1, for example, each of the cabinets 12-1 and 12-3 is a cabinet with an RFID antenna, which is communicating with the reader/writer 14. The number of the cabinet 12 with an RFID antenna depends on the size of the warehouse and the number of the items. The reader/writer 14 communicates with the central control unit 16. The communication may be either wireless or wired. The control unit 16 can communicate with a host computer (server) inside or outside the warehouse. It is a matter of course that the cabinets 12 may be placed in an office, a shop or a factory instead of in the warehouse 10.

Figure 2:
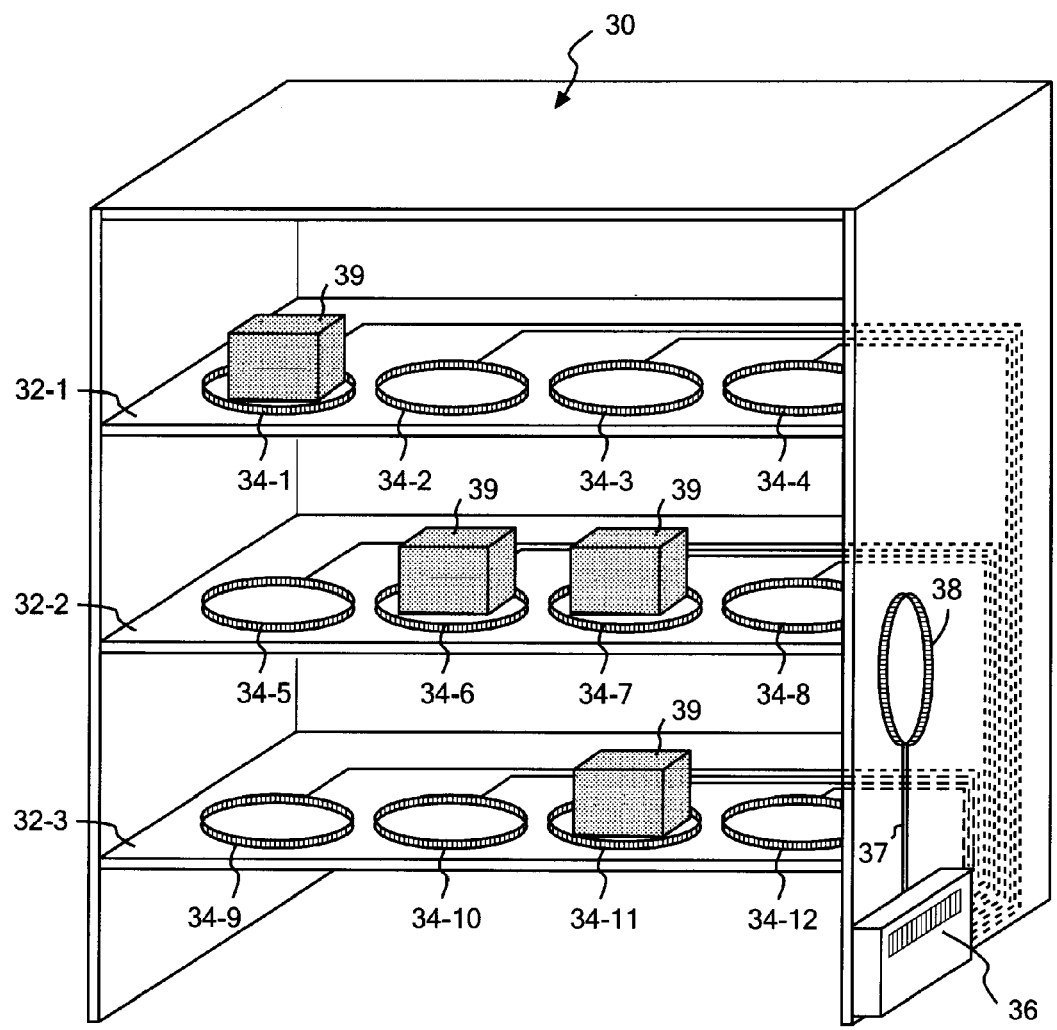
FIG. 2 is a conceptual diagram of a cabinet with an RFID antenna according to the present invention.

FIG. 2 is a conceptual diagram of a cabinet 30 with an RFID antenna according to the present invention. In FIG. 2, the cabinet 30 is exemplified as a shelf with three plates 32-1 to 32-3 (three stages). At least one or more plates (stages) 32 may be used. The size of the plate 32 is not limited to a case where items are arranged in a row, but may be in any size with items arranged in two or more rows. Further, the cabinet 30 may be in any form if two or more items can be placed in the housing instead of being limited to a form of a shelf. Four loop antennas 34-1 to 34-4, 34-5 to 34-8, and 34-9 to 34-12 are set on the plates 32-1, 32-2, and 32-3, respectively.

Loop antennas 34-1 to 34-12 are provided to correspond to items placed in a predetermined region on a plate 32 respectively. Here, the term 'predetermined region' means a region defined by the loop antenna 34. In other words, the predetermined region means a region in which a loop antenna 34 and an IC tag corresponding thereto can communicate with each other. Specifically, each of the loop antennas 34-1 to 34-12 can communicate with an IC tag (not shown) attached to an item 39 that is placed on the antenna 34 or in an aperture of the antenna 34. The loop antennas 34 shown in FIG. 2 are merely an example, and other antennas such as a Dipole antenna or a patch antenna may be used as the antenna 34.

Each of the loop antennas 34-1 to 34-12 is connected (wired) with an antenna selector 36 attached on the outside surface of a shelf via a cable. In FIG. 2, wiring (cable) between the loop antennas 34-1 to 34-4 and the antenna selector 36 is shown only for the plate 32-1. For the other plates 32-2, 32-3, the wiring is partially omitted. The place to arrange the antenna selector 36 is not limited to the outside surface of the cabinet 30 and may also be inside the cabinet 30. The antenna selector 36 has an external loop antenna 38 that can communicate with an external reader/writer. The antenna selector 36 and the loop antenna 38 are connected by any length of coaxial cable 37.

The antenna selector 36 is a switch for connecting the loop antennas 34-1 to 34-12 on the plates 32 with the external loop antenna 38 in order. The antenna selector 36 operates under the control of the reader/writer (14 in FIG. 1). Specifically, communication between the reader/writer 14 and the external loop antenna 38 triggers the operation of the antenna selector 36. The control unit 16 shown in FIG. 1 may directly control the antenna selector 36. In such a case, the control unit 16 directly sends a radio signal to the external loop antenna 38 or a built in antenna provided in another antenna selector 36. As such, the antenna selector 36 communicates with the external reader/writer or the control unit 16 only during its operation instead of always being connected with a particular reader/writer. Thus, the antenna selector 36 can basically use any reader/writer that can communicate with the external loop antenna 38. If there is at least a selected reader/writer, it can be shared by two or more cabinets.

A radio-frequency switch is desirable as the antenna selector 36. This is because the radio-frequency switch wastes little power when it switches the connection. Here, the radio-frequency switch is a type of analog circuit for switching ON/OFF of the channel through which an analog signal passes according to the state of the control signal. The radio-frequency switch is also called as the RF switch. The radio-frequency switch differs from a general analog switch in its usage and the power being passed. The radio-frequency switch is mainly used for switching transmitting/receiving in a radio communication apparatus. In some modulation schemes, the radio-frequency switch is used for switching a signal with more than several watts. The radio-frequency switch in the SPnt (Single, Pole, n-Throws) structure that can serially switch and connect an antenna with two or more antennas is used as the antenna selector 36.

Figure 3:
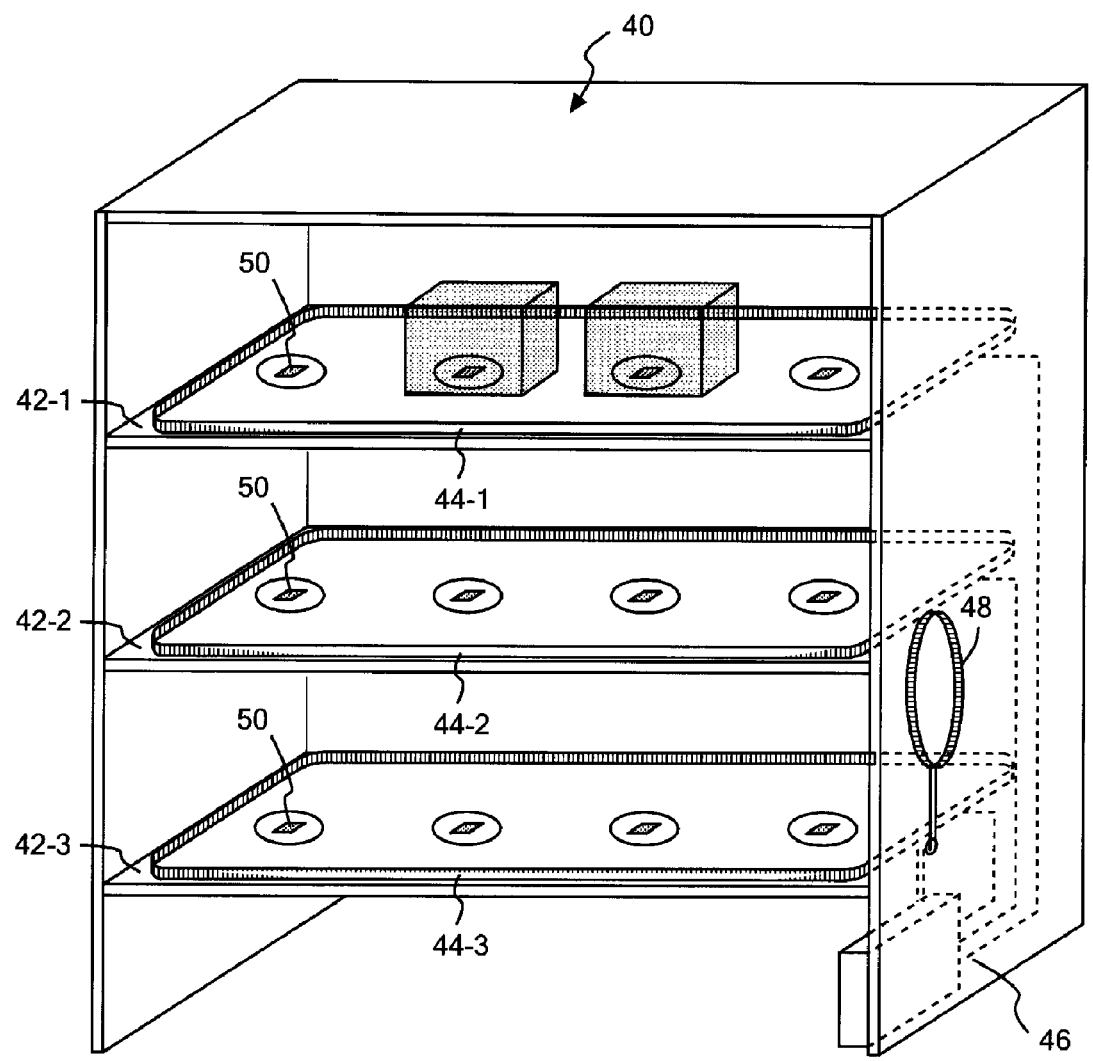
FIG. 3 is a conceptual diagram of a cabinet with an RFID antenna according to the present invention.

FIG. 3 is another conceptual diagram of a cabinet 40 with an RFID antenna. Also in FIG. 3, the cabinet 40 is exemplified as a shelf with three plates 42-1 to 42-3 (three stages). In FIG. 3, common loop antennas 44-1 to 44-3 are placed on the plates 42-1 to 42-3, respectively. To this extent, the cabinet 40 shown in FIG. 3 differs from the example shown in FIG. 2 in which a loop antenna is provided for each item placed on the plates 32-1 to 32-3. The cabinet 40 shown in FIG. 3 differs from the example shown in FIG. 2 also in that the antenna selector 46 is placed inside the cabinet 40. An external loop antenna 48 is arranged in the same way as in the case shown in FIG. 2. The loop antennas 44-1 to 44-3 are connected with (wired to) the antenna selector 46 via a cable respectively.

In FIG. 3, an IC tag 50 for determining a position for an item to be placed on is arranged on each plate 42. The IC tags 50 communicate with the loop antennas 44-1 to 44-3 on the plates 42 respectively on which the IC tag 50 is placed. When an item is placed on the IC tag 50, the communication between the IC tag 50 and one of the loop antennas 44-1 to 44-3 corresponding to the IC tag 50 is blocked. As a result, the position (plate, stage of the shelf) is determined. Something for blocking a magnetic flux may need to be attached to the item to certainly block the communication between the IC tag 50 and the loop antenna 44. At the same time when the communication between the IC tag 50 and the corresponding loop antenna 44 is blocked, communication between the IC tag 50 attached to the placed item and one of the loop antennas 44-1 to 44-3 starts so that the IC tag 50 can be recognized. The operation of detecting information on the IC tag 50 will be described later. If the position of an item needs not to be determined, the IC tags 50 are not placed. The configuration shown in FIG. 3 is effective to detect the position, i.e., the presence of an item and information on the IC tag 50 attached to the item for each plate (stage in the shelf). In that case, the configuration is advantageous in reducing the number of antennas.

Figure 4:
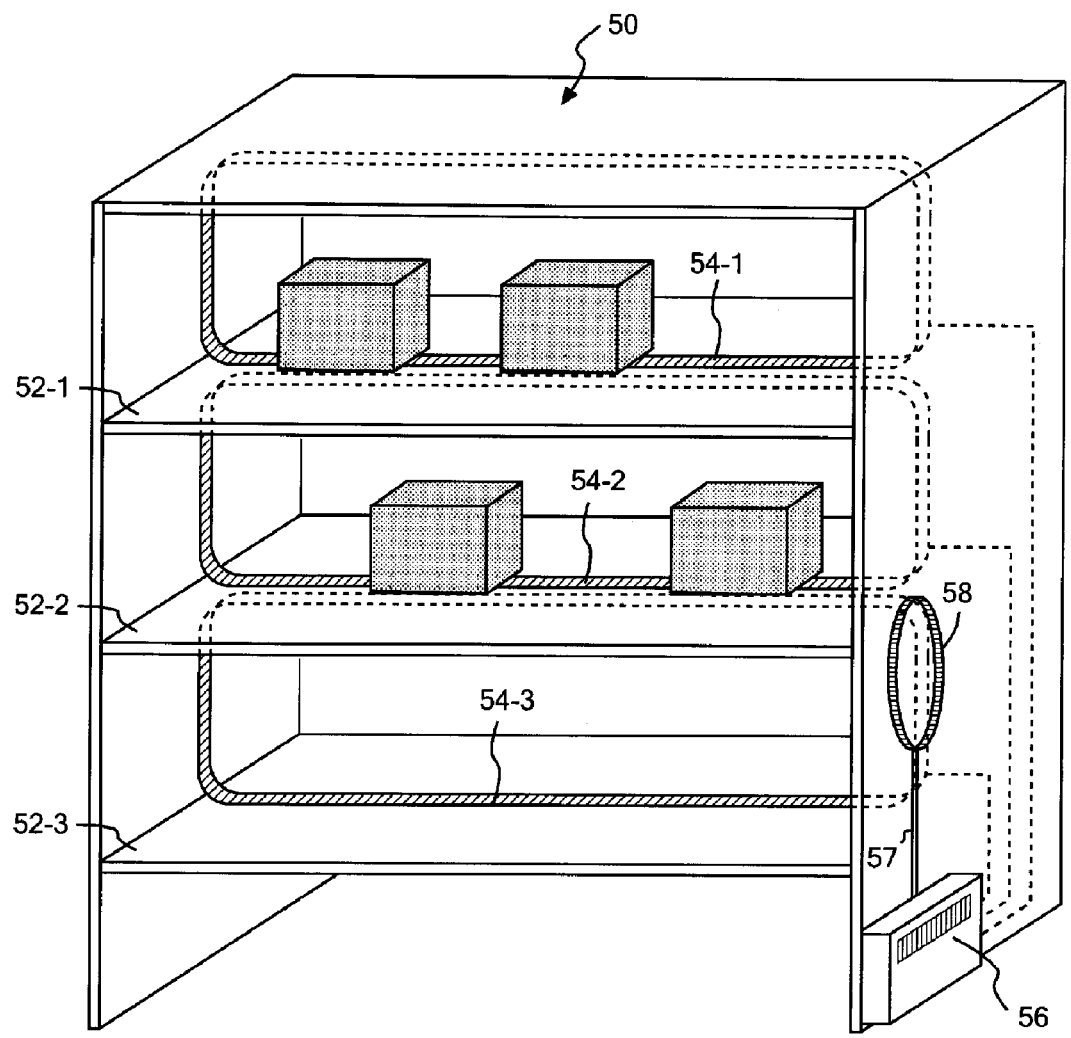
FIG. 4 is a conceptual diagram of a cabinet with an RFID antenna according to the present invention.

Although the loop antennas 44-1 to 44-3 are arranged substantially in parallel with the surfaces of the plates 42-1 to 42-3 in FIG. 3, as shown in FIG. 4 the loop antennas 54-1 to 54-3 may be arranged substantially perpendicular to the surfaces of the plates 52-1 to 52-3 between the plates 52. In that case, each of the loop antennas 54-1 to 54-3 is shared by items on each of the plates 52-1 to 52-3 as in the case shown in FIG. 3. An IC tag for detecting a position may be provided in the configuration shown in FIG. 4 as in the case shown in FIG. 3.

A different type of loop antenna may be set for each plate (stage) in a cabinet. Specifically, the loop antenna 34 shown in FIG. 2 may be set on a plate, and the loop antenna 44 or 54 shown in FIG. 3 or 4 may be placed on another plate. Different types of loop antennas may be set for each of two or more plates (stages). That arrangement corresponds to grouping of loop antennas. The Dipole antenna, the patch antenna and the like may be mixed with the loop antennas.

Now, an operation of an embodiment of the present invention will be described. The description will be made by taking an example of the automated warehouse shown in FIG. 1. The control unit 16 in the warehouse 10 receives a command from a server 18 and sends an operational signal to the reader/writer 14. The reader/writer 14 moves to the front of the first cabinet 12-1 that is to be managed. The cabinet 12-1 is any of the cabinets 30, 40, 50 with an RFID antenna exemplified in FIG. 2 or 4. In this example, it is assumed that each of the cabinets 12-1 and 12-3 is the cabinet 30 with an RFID antenna shown in FIG. 2. The reader/writer 14 sends a radio wave including a control signal for switching an antenna to the external loop antenna 38 of the cabinet 30 (12-1). The antenna selector 36 receives the control signal, first selects the loop antenna 34-1 at the first stage of the shelf, and connects the external loop antenna 38 to the loop antenna 34-1. Here, the radio wave received by the external loop antenna 38 is propagated to the loop antenna 34-1 via the antenna selector 36. If the radio-frequency switch is used as the antenna selector 36 as mentioned above, the power wasted in switching the antenna connection can be reduced.

The radio wave is sent from the loop antenna 34-1 to the IC tag (now shown) attached to the item 39. The resonance (electromagnetic induction) in a compact antenna in the IC tag generates an electromotive force. That electromotive force causes a circuit in the IC tag to operate to perform necessary processing. The circuit in the IC tag carries the processed result on a modulated radio wave and sends them from the compact antenna inside the IC tag to the loop antenna 34-1. The modulated radio wave is propagated from the loop antenna 34-1 to the external loop antenna 38 via the antenna selector 36. The modulated radio wave is sent from the external loop antenna 38 to an antenna inside the reader/writer 14. The reader/writer 14 decodes (demodulates) the received modulated radio wave and sends the processed result to the control unit 16. Through the series of operations, the control unit 16 can obtain information (ID, history, customer information and the like) on the items 39 in a region of the loop antenna 34-1.

Next, the antenna selector 36 connects the external loop antenna 38 with the loop antennas 34-2, 34-3, . . . 34-11, 34-12 in order. In each of the connection, the above-mentioned series of detecting operations are repeated. As a result, the information (ID, history, customer information and the like) on the items 39 in the region of each of the loop antennas 31-1 to 34-N can be obtained. The switching operation performed by the antenna selector 36 is not necessarily performed on all the loop antennas 31-1 to 34-N. The antenna selector 36 may connect only a group of previously selected loop antennas 31-1 to 34-N with the external loop antenna 38.

After collecting information on the first cabinet 12-1 (FIG. 1), the reader/writer 14 moves to the front of the second cabinet 12-3 to be managed. Then, the series of detecting operations as in the case of the first cabinet 12-1 are performed. Thereafter, the same operations are performed by the number of cabinets needed. The control unit 16 sends collected and edited information to the server 18 during or at the end of the series of detecting operation. The server 18 sends an additional command signal to the control unit 16, if required, according to the obtained information.

The present invention has been described with reference to the drawings. The present invention is not limited to the embodiment, though. It is apparent to those skilled in the art that any modification is possible without departing from the spirit of the present invention. Although the external loop antenna, the antenna selector, each loop antenna and the like shown in FIGS. 2 to 4 appear to be set on the cabinet (shelf) from outside, they may be built in the cabinet as built-in units (as an integral type) when the cabinet is manufactured, for example. In that case, as the antenna and the like cannot be seen from outside, the cabinet is more appropriately used as a showcase or the like that can be seen by customers, for example.

What is claimed is:

1. An RFID antenna system comprising:
   a single wireless external reader/writer; and
   a plurality of cabinet storage units, each of the plurality of cabinet storage units separately wirelessly connected to the single wireless external reader/writer, each of the plurality of the cabinet storage units including:
      a single first antenna for communicating with the single wireless external reader/writer in response to the single first antenna receiving a wireless signal from the single wireless external reader/writer;
      a single antenna selector wired to the single first antenna; and
      a plurality of second antennas, each of the plurality of second antennas connected to the single antenna selector connected to the single first antenna,
      wherein the single antenna selector is triggered to connect each of the plurality of second antennas, separately, to the single first antenna in response to a communication between the single wireless external reader/writer and the single first antenna.

2. The RFID antenna system according to claim 1, wherein the single antenna selector comprises a radio-frequency switch.

3. The RFID antenna system according to claim 1, wherein the each of the plurality of the cabinet storage units further includes:
   a plurality of articles located within an antenna periphery range of the plurality of second antennas; and
   an IC tag coupled to each of the plurality of articles,
   wherein each of the plurality of second antennas communicate with the IC tag to obtain information relating to each of the plurality of articles.

4. The RFID antenna system according to claim 3, wherein each of the plurality of articles are located within the antenna periphery range of each of the plurality of second antennas.

5. The RFID antenna system according to claim 3, wherein the plurality of second antennas include:
   at least one either of a group of antennas for communicating with the IC tag coupled to the article located within the antenna periphery range of the plurality of second antennas; and
   a group of antennas for communicating with two or more IC tags coupled to two or more articles located within the antenna periphery range of the plurality of second antennas.

6. The RFID antenna system according to claim 1, wherein the communication between the single wireless external reader/writer and the single first antenna includes the single wireless external reader/writer sending a wireless signal to the single first antenna.

7. An item management system comprising:
   an RFID antenna system including:
      a single wireless external reader/writer; and
      a plurality of cabinet storage units, each of the plurality of cabinet storage units separately wirelessly connected to the single wireless external reader/writer, each of the plurality of the cabinet storage units including:
         a single first antenna for communicating with the single wireless external reader/writer in response to the single first antenna receiving a wireless signal from the single wireless external reader/writer;
         a single antenna selector wired to the single first antenna; and a plurality of second antennas, each of the plurality of second antennas connected to the single antenna selector connected to the single first antenna,
wherein the single antenna selector is triggered to connect each of the plurality of second antennas, separately, to the single first antenna in response to a communication between the single wireless external reader/writer and the single first antenna; and
a control unit wirelessly coupled to the single wireless external reader/writer of the RFID antenna system for wirelessly communicating with the single wireless external reader/writer.

8. The item management system according to claim 7, wherein the RFID antenna system further includes:
a plurality of articles located within an antenna periphery range of each of the plurality of second antennas; and
an IC tag coupled to each of the plurality of articles,
wherein each of the plurality of second antennas communicate with the IC tag to obtain information relating to each of the plurality of articles.

9. The item management system according to claim 8, wherein each of the plurality of articles are located within the antenna periphery range of a distinct second antenna of the plurality of second antennas.

10. The item management system according to claim 7, wherein the communication between the single wireless external reader/writer and the single first antenna includes the single wireless external reader/writer sending a wireless signal to the single first antenna.

11. A cabinet storage unit with an RFID antenna, comprising:
a housing component;
a single first antenna attached to a surface of the housing component for communicating with a single wireless external reader/writer in response to a the single first antenna receiving a wireless signal from the single wireless external reader/writer;
a single antenna selector attached to the surface of the housing, the single antenna selector wired to the single first antenna; and
a plurality of second antennas, provided on at least one holder inside the housing, each of the plurality of second antennas connected to the single antenna selector connected to the single first antenna,
wherein the single antenna selector is triggered to connect each of the plurality of second antennas, separately, to the single first antenna in response to a communication between the single wireless external reader/writer and the single first antenna.

12. The cabinet storage unit with an RFID antenna according to claim 11, wherein the single antenna selector includes a radio-frequency switch.

13. The cabinet storage unit with an RFID antenna according to claim 11, further comprising:
a plurality of articles located within an antenna periphery range of each of the plurality of second antennas; and
an IC tag coupled to each of the plurality of articles,
wherein each of the plurality of second antennas communicate with the IC tag to obtain information relating to each of the plurality of articles.

14. The cabinet with an RFID antenna according to claim 13, wherein each of the plurality of articles are located within the antenna periphery range of a distinct second antenna of the plurality of second antennas.

15. The cabinet with an RFID antenna according to claim 13, wherein the plurality of second antennas include:
at least one of a group of antennas for communicating with the IC tag coupled to the article located within the antenna periphery range of the plurality of second antennas; and
a group of antennas for communicating with two or more IC tags coupled to two or more articles located within the antenna periphery range of the plurality of second.

16. The cabinet storage unit with an RFID antenna according to claim 11, wherein the communication between the single wireless external reader/writer and the single first antenna includes the single wireless external reader/writer sending a wireless signal to the single first antenna.

17. An item management system, comprising:
a cabinet storage unit with an RFID antenna, comprising:
a housing component;
a single first antenna attached to a surface of the housing component for communicating with a single wireless external reader/writer in response to the single first antenna receiving a wireless signal from the single wireless external reader/writer;
a single antenna selector attached to the surface of the housing, the single antenna selector wired to the single first antenna; and
a plurality of second antennas, provided on at least one holder inside the housing, each of the plurality of second antennas connected to the single antenna selector connected to the single first antenna,
wherein the single antenna selector is triggered to connect each of the plurality of second antennas, separately, to the single first antenna in response to a communication between the single wireless external reader/writer and the single first antenna; and
a control unit wirelessly coupled to the single wireless external reader/writer of the cabinet storage unit for communicating with the single wireless external reader/writer.

18. The item management system according to claim 17, wherein the cabinet storage unit with an RFID antenna further includes:
a plurality of articles located within an antenna periphery range of each of the plurality of second antennas; and
an IC tag coupled to each of the plurality of articles,
wherein each of the plurality of second antennas communicate with the IC tag to obtain information relating to each of the plurality of articles.

19. The item management system according to claim 18, wherein each of the plurality of articles are located within the antenna periphery range of a distinct second antenna of the plurality of second antennas.

20. The item management system according to claim 17, wherein the communication between the single wireless external reader/writer and the single first antenna includes the single wireless external reader/writer sending a wireless signal to the single first antenna.

* * * * *